Patented Aug. 25, 1931

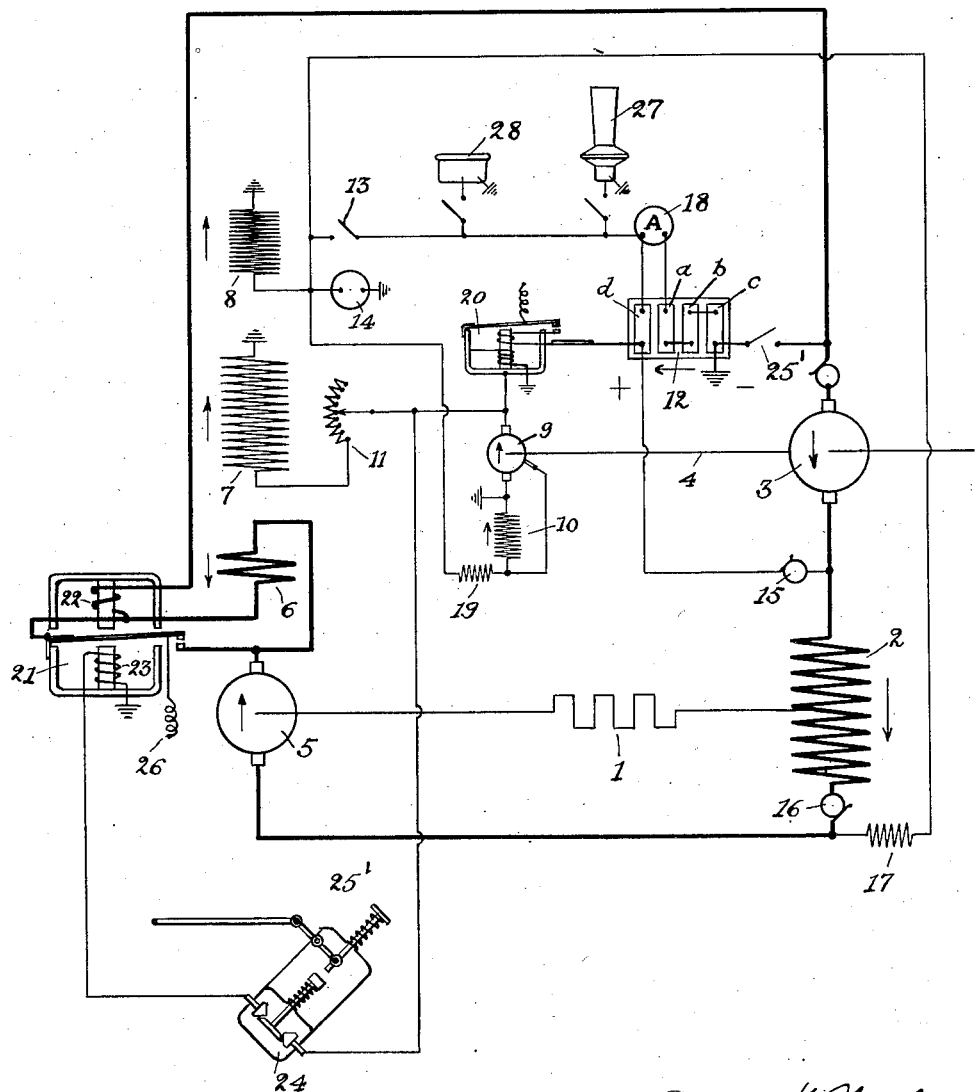

1,820,861

UNITED STATES PATENT OFFICE

ALFONS HENRY NEULAND, OF IRVINGTON, NEW JERSEY, ASSIGNOR TO ELECTROMOBILE CORPORATION, OF IRVINGTON, NEW JERSEY

ELECTRIC SYSTEM FOR VEHICLES

REISSUED

Application filed July 12, 1928. Serial No. 292,195.

This invention relates to improved methods and means for electromagnetically transmitting power from a prime mover to a load.

In my copending application Serial #162,788 filed January 22, 1927 for power transmission devices I disclosed an apparatus having clutch and booster dynamos for variously transmitting power from a prime mover to load and including a regulating dynamo operated by the load shaft for automatically controlling the speed and torque relationships.

My invention is particularly adapted for use in the type of apparatus in which a dynamo is rotatably associated with a power shaft and a load shaft by suitable mechanical connections and cooperates with another dynamo to transmit power between the shafts.

Another object is to provide a system capable of cooperating with the other devices on a vehicle such as a battery, ignition coil, lights, etc.

Still another object is to provide improved means including the accelerator for controlling engine speed and torque relationships by variations of the engine throttle.

A further object is to secure the many functions with relatively few devices and simple circuit connections.

Still further objects and advantages of my system will appear from the following description of which The single figure of the drawing is a wiring diagram showing schematically the relationships between the electrical and mechanical elements of the system and the engine, propeller, accelerator and translating devices on the vehicle.

Referring to the drawing, the power source or engine on the vehicle is represented by the crankshaft 1 which drives the series field coil 2 mounted on the field system of the clutch dynamo. The clutch armature 3 is connected to and drives the propeller shaft 4 of the vehicle represented by 4. The booster dynamo has an armature 5 operatively connected to crank shaft 1 and is provided with a series coil 6 having relatively few turns with respect to the series field coil 2. The two armatures and field coils are connected in series the heavy line representing the load circuit. The booster field system is also provided with a regulating shunt coil 7 and a coil 8 particularly for the purpose of stabilizing booster motoring action and the system on light loads.

The subject matter for energizing and controlling the dynamos is broadly claimed in my copending application Serial #219,227 filed Sept. 13, 1927.

A small regulating dynamo is also provided having its armature 9 operatively connected to propeller shaft 4 and its field coil 10 connected to a third brush. The regulator armature is continuously connected to and supplies a varying current to coil 7 in the direction of arrow, the cut out 20 establishing an intermittent connection with other devices on the vehicle.

A battery 12 is provided to cooperate with the system and with the auxiliary devices on the vehicle. I provide circuit connections whereby when the ignition switch 13 is closed the potential from cells $a$, $b$ and $c$ is impressed on the ignition coil 14 and on booster coil 8, current flowing in the direction of arrow. This feature is claimed in my application Serial #294,993 filed July 24, 1928. At the same time the potential from cell $d$ is impressed on the clutch coil 2 the current flowing from cell $d$ to slip ring 15 thru coil 2, slip ring 16, current limiting resistance 17, switch 13 ammeter 18 back to cell $d$. From the junction point near switch 13 another circuit is established including the resistance 19, permitting a minute current flow thru regulating dynamo coil 10 in the direction of arrow.

I provide means, such as the switch 21, to shunt current away from the series coil 6 in order to aid stabilization during the engine idling period, and for other reasons which will hereafter be pointed out. The switch is arranged to be operated by the coils 22 or 23, the former traversed by current in the load circuit and the latter connected to and supplied with potential and current from the regulator armature 9 thru the switch 24 to be opened or closed by the movement of accelerator 25.

The operation of the system in connection with a vehicle may best be understood from the following: When operator depresses starting switch 25', all battery cells are connected across armature 3 and a second circuit is established including armature 5 and coils 2 and 6. This feature is described and claimed in my application Serial #219,226, filed Sept. 13, 1927. The engine is started and set in operation upon closing of switch 13. Assuming the vehicle locked and the propeller shaft stationary a flow of current will immediately be established in the load circuit, the clutch acting as a generator by reason of its relatively powerful series field and the relatively weaker booster series field which is reversely connected for motor action. A series circuit of this nature is unstable and subject to surging and reversal of clutch polarity during engine idling and light load periods, especially if the booster motoring action is considerable, which is essential if a substantial engine torque multiplication and powerful propeller torque is to be produced. However, the switch 13 as heretofore stated permits a flow of current from cell $d$ thru coil 2 in direction of arrow which, when current in main circuit decreases to a point where the booster counter potential threatens to reverse its flow, maintains the clutch polarity and potential and so stabilizes the system especially since the booster motoring action and counter potential are minimized by switch 21 which is held closed by the spring 26 not materially opposed by the weak current in coil 22 at this moment.

The stabilizing coil 8 is supplied with current from the battery cells $a$, $b$ and $c$ which establishes a relatively small magnetomotive force in the booster field opposed to that due to coil 6 so that when current in load circuit decreases to a point where it threatens to reverse, the magnetomotive force in coil 8 becomes instantly effective in reducing or even reversing booster flux and potential and thereby to oppose surging and to maintain current direction in load circuit.

The maximum propeller torque is produced when the vehicle is stalled and engine throttle is open to its full extent. Propeller shaft 4 is at rest and no current flows in the coil 23 so that the heavy load current in coil 22 opens switch 21 and allows the entire load current to traverse coil 6, which thereby exerts a powerful torque on armature 3 in aid of the engine torque and causes a rapid building up of propeller torque to its maximum. There is at present no current flow in the regulating coil 7 while the relatively small opposing magnetomotive force in the stabilizing coil 8 does not materially interfere with the ever so much greater force in coil 6 at the present moment.

As the vehicle gets under way the regulator armature 9, aided by the slightly energized field coil 10, generates a potential and sends an increasing current thru regulating coil 7 which increasingly opposes coil 6, diminishes booster flux and counter potential and prevents a too rapid increase of engine speed. When the increasing potential of armature 9 raises the current in switch coil 23 to a point where its force exceeds that due to current in coil 22, the switch 21 closes and shunts current away from coil 6. If the propeller speed, at this time, is nearly that of the engine an automatic transition will take place, that is the propeller shaft will pass thru synchronism for the reason that shunting of coil 6 reduces its magnetomotive force, the force due to coils 7 and 8 predominates, reverses booster flux and potential and forces the booster at first to take over energization of the load circuit and thereafter to supply a potential in excess of this and to cause propeller to overrun the engine.

The subject matter of short-circuiting the booster series coil with a switch operated by an accelerator is broadly claimed in my application Serial #296,468 filed July 31, 1928.

After the vehicle has accelerated and the operator wishes only to maintain this speed, he releases throttle partly and thereby reduces engine torque and current in load circuit. If it happens that the propeller speed is again nearly that of the engine such a throttle change will also result in transition of the propeller shaft due to the fact that the unchanged current in coil 23 allows its force to predominate over that due to the weakened current in coil 22; this closes the switch and so reverses the booster flux and electromotive force. The booster now receives a torque from engine the speed of which, due also to decreased throttle opening, drops below that of propeller shaft.

The accelerator 25 may be adjusted to allow a full engine throttle opening before the switch 24 opens. This permits the operator to secure the maximum engine torque at a relatively low and efficient engine speed and at his option, by a further depression of accelerator, interrupt the circuit of coil 23. Current in 22 opens switch 21, the load current traverses coil 6 in opposition to coils 7 and 8 weakens the booster flux, permits engine to speed up and develop more power which, due to changed relationships, increases propeller torque and rate of vehicle acceleration.

From the foregoing it will be understood that the entire cycle of operation, including stabilization during the idling period, production of maximum propeller torque, acceleration, transition, and engine speed control are all accomplished either automatically or by changes in the engine throttle. This greatly simplifies the operation of a motor vehicle and permits the operator to pay more attention to safety.

I desire to emphasize the importance of efficiency in the transmission apparatus of a vehicle. Aside from overheating that results from poor efficiency, any considerable loss of power reflects in increased engine speed, poor acceleration and general sluggishness. It will be seen that due to the methods and means employed my system is efficient, for instance, under normal operating conditions, when overspeeding, the current in coil 7 need only be moderate in order to supply the needed booster field in view of the fact that at this time the coil 6 is shunted and offers practically no opposition as a consequence of which the regulating dynamo need only supply a relatively small amount of energy for this purpose. On the other hand when the maximum propeller torque must be developed there is no current in coil 7, the relatively negligible opposition of coil 8 permits economical production of powerful booster motoring torque with relatively few turns in series coil 6. The load current is very great and the ability of my system to furnish its own excitation at this time will be recognized as important in view of the great amount of excitation energy that is required for the production of the maximum propeller torque which the vehicle at times demands. Furthermore, as stated, my system operates the auxiliary devices on the vehicle such as the ignition coil 14, horn 27 and lamp 28 when a predetermined voltage has closed the cut out switch 20 and established connection from regulator dynamo armature 9, thru cell $d$ which thereby receives a charge. The surplus current from armature 9 charges the cell $d$ and cells $a$, $b$ and $c$ in series. This insures a supply of stabilizing current for coils 2 and 8 as well as current for the other devices on the vehicle.

The combination of a regulating dynamo for charging a battery and regulating an electric system is claimed in my application Serial #292,194 filed July 12, 1928.

While I have provided for effective stabilization under extreme conditions when all the means shown may be used I wish to point out that in some instances the coil 8 may be omitted and stabilization accomplished by means of the switch 21 in combination with a slight current source for clutch coil 2. In other instances the current source for coil 2 may be omitted and the system stabilized by means of the coil 8 with the aid of some means such as switch 21 for shunting current when coil 6 is strong or without the switch 21 when coil 6 is relatively weak as compared with the clutch coil 2.

The feature of driving the regulator from the propeller shaft is not claimed in this application but is claimed in my copending application Serial #162,788 filed January 22, 1927.

From the foregoing it will be seen that my system accomplishes the operation and control of a vehicle with relatively few and efficient devices. However, I desire to have it understood that my invention is adapted for other uses and that it may be used in whole or in part, depending upon the conditions to be met, in the described or other embodiments within the principle and scope of my invention.

Having now described my invention what I claim and desire to secure by Letters Patent is:

1. In a transmission system, an internal combustion engine, a load shaft, a clutch dynamo interposed between engine and load shaft, a booster dynamo operatively connected to engine and having a series field coil, a switch for short-circuiting the field coil when load current is light, and a variable potential generator for closing the switch in opposition to the load current.

2. In a transmission system, an internal combustion engine having a throttle mechanism, a load shaft, a clutch dynamo interposed between engine and load shaft, a booster dynamo operatively connected to engine having a series field coil, a variable potential auxiliary generator, an electromagnetic switch operative to shortcircuit the series coil when the generator potential reaches a predetermined value and a second switch operative by the movement of the throttle mechanism to interrupt the generator current and to open the field short circuit.

3. In a transmission system a power source, a load shaft, a clutch dynamo interposed between power source and load shaft having a series field coil, a booster dynamo operatively connected to engine and having a shunt field coil, a battery having one of its cells connected to the series coil and several of its cells connected to the shunt coil, an auxiliary generator, and a switch for connecting the generator to battery to supply a charging current to said cells.

4. In a transmission system a power source, a load shaft, a clutch dynamo interposed between power source and load shaft having a series field coil, a booster dynamo operatively connected to engine and having a plurality of shunt field coils, a battery having one of its cells connected to the series coil and several of its cells connected to one of the shunt coils, an auxiliary generator connected to a second shunt coil and a switch for connecting the generator to battery to supply a charging current to said cells.

5. In combination, an internal combustion engine having a shaft, a load shaft, a dynamo rotatively connected with engine and load shafts, a second dynamo rotatively connected with engine shaft having a field element and a plurality of field coils, means including one of the field coils adapted to magnetize the field element in motoring direction, means including another field coil adapted to magnetize the field element in generating direction, and an electromagnetic switch connected to one of the field coils and adapted to reverse the magnetization of the field element.

6. In combination, an engine shaft, a load shaft, a dynamo rotatively connected with both shafts, a second dynamo rotatively connected with one of the shafts having a plurality of field coils, a storage battery for energizing one of the field coils, a rotatable auxiliary generator for energizing another field coil and means for varying the speed of the auxiliary generator.

7. In combination, an engine shaft, a load shaft, a dynamo rotatively connected with engine shaft and load shaft, a second dynamo rotatively connected with one of the shafts having a plurality of field coils, a battery connected to one of the field coils, an auxiliary generator connected to another field coil and an electromagnetic switch for connecting the battery with the auxiliary generator.

8. In combination, an internal combustion engine having a shaft, a load shaft, two dynamo electric machines adapted to transmit power between the shafts, a variable potential auxiliary generator rotatively connected with one of said shafts and means operated by variations of the auxiliary generator potential adapted to reverse the voltage with respect to the current in the dynamos.

9. In combination, an internal combustion engine having a shaft, a load shaft, a dynamo rotatively connected to engine and load shafts, a booster dynamo rotatively connected to engine shaft having a plurality of field coils, a variable potential auxiliary generator, and an electromagnetic switch operated by the varying potential of the auxiliary generator adapted to vary the current in one of the field coils.

10. In combination, an engine shaft, a load shaft, a dynamo rotatively connected with engine shaft and load shaft, a second dynamo rotatively connected with one of the shafts and cooperating with the first dynamo to transmit power between the shafts, an electromagnetic switch, and means cooperating with said electromagnetic switch adapted to operate one of the dynamos as a generator when the switch is in one position and as a motor when the switch is in another position.

11. In combination, an engine shaft, a load shaft, a dynamo rotatively connected with both shafts having a field element, a second dynamo rotatively connected with the engine shaft having a field element, a source of current, means for exciting the field element of the first dynamo with current from one of the dynamos, means for energizing the field element of the second dynamo, a load circuit including the dynamos, means for varying the excitation of the field element of the second dynamo, and means for maintaining a slight magnetization in the field element of the first dynamo with a minor current from said source when current in load circuit ceases.

12. The means for uninterruptedly accelerating a load, which includes an engine having a shaft, a load shaft, a reversible dynamo rotatively connected with both shafts, a unidirectionally rotating second dynamo rotatively connected with the engine shaft, a closed load circuit including both dynamos, a regulating dynamo connected with one of the shafts and means including said regulating dynamo for varying the rate of acceleration of engine shaft with respect to the rate of acceleration of load shaft.

13. In combination, an engine having a shaft, a load shaft, a dynamo rotatively connected with both shafts, a second dynamo rotatively connected with the engine shaft, a variable speed regulating dynamo rotatively connected with one of the shafts, means including the regulating dynamo for operating second dynamo as a motor when the speed of regulating dynamo is relatively low and for operating the second dynamo as a generator when the speed of regulating dynamo is relatively high.

14. In combination, an engine shaft, a load shaft, a dynamo rotatively connected with both shafts having a field element, a second dynamo rotatively connected with the engine shaft having a field element, means for magnetizing both field elements with load current from one of the dynamos, and a separate source of current for maintaining a relatively slight magnetization in one of the field elements whenever load current ceases during operation of load shaft.

Signed at Newark, in the county of Essex and State of New Jersey this 10th day of July A. D. 1928.

ALFONS HENRY NEULAND.